US011235733B2

(12) United States Patent
Taljaard

(10) Patent No.: US 11,235,733 B2
(45) Date of Patent: Feb. 1, 2022

(54) REMOTELY ACTIVATED VEHICLE ANTI-THEFT DEVICE

(71) Applicant: HARDCORE AUTOMOTIVE LOCKING TECHNOLOGIES (PTY) LTD, Nelspruit (ZA)

(72) Inventor: Philippus Petrus Erasmus Taljaard, Nelspruit (ZA)

(73) Assignee: HARDCORE AUTOMOTIVE LOCKING TECHNOLOGIES (PTY) LTD

( * ) Notice: Subject to any disclaimer, the term of this patent is extended or adjusted under 35 U.S.C. 154(b) by 221 days.

(21) Appl. No.: 16/330,000

(22) PCT Filed: Jun. 13, 2017

(86) PCT No.: PCT/IB2017/053496
§ 371 (c)(1),
(2) Date: Mar. 1, 2019

(87) PCT Pub. No.: WO2018/042264
PCT Pub. Date: Mar. 8, 2018

(65) Prior Publication Data
US 2019/0202403 A1    Jul. 4, 2019

(30) Foreign Application Priority Data

Sep.  2, 2016  (ZA) ................................ 2016/06093
Sep. 28, 2016  (ZA) ................................ 2016/06693
Dec. 12, 2016  (WO) .................. PCT/IB2016/057538

(51) Int. Cl.
*B60R 25/06*    (2006.01)
*B60R 25/20*    (2013.01)
(Continued)

(52) U.S. Cl.
CPC .............. *B60R 25/06* (2013.01); *B60K 28/10* (2013.01); *B60R 25/04* (2013.01); *B60R 25/10* (2013.01);
(Continued)

(58) Field of Classification Search
CPC ......... B60R 25/06; B60R 25/04; B60R 25/24; B60R 25/32; B60R 25/33; B60R 25/10;
(Continued)

(56) References Cited

U.S. PATENT DOCUMENTS 5,714,807 A    2/1998  Albanes
5,827,149 A   10/1998  Sponable
(Continued)

FOREIGN PATENT DOCUMENTS

WO    WO 2008/007371    1/2008

OTHER PUBLICATIONS

International Search Report prepared by the U.S. Patent and Trademark Office dated Aug. 16, 2017, for International Application No. PCT/IB2017/053496.
(Continued)

*Primary Examiner* — Nam V Nguyen
(74) *Attorney, Agent, or Firm* — Sheridan Ross P.C.

(57) ABSTRACT

A remotely activated vehicle anti-theft device 10 and system 50 for preventing vehicle theft is provided. The device 10 is moved between unlocked, locked and priority locked states using either a wireless vehicle remote 51 or a mobile phone 52. The mobile phone 52 enjoys priority over the remote control 51 and overrides it when the device is in its priority locked state. It includes a pivotal locking member 17 which is movable between an open position (unlocked state) in which the member is spaced away from a gear 12, permitting it to rotate freely, and a locked position (locked and priority locked states), in which the member 17 engages the gear 12
(Continued)

and prevents rotation thereof, thereby immobilising a vehicle. The device 10 includes an ECU 22, wireless communication module 34, actuator 23, GPS 6 and speed sensor 7 housed in a tamper-proof casing 27.

21 Claims, 7 Drawing Sheets

(51) Int. Cl.
| | | |
|---|---|---|
| *B60R 25/04* | (2013.01) | |
| *B60K 28/10* | (2006.01) | |
| *B60R 25/24* | (2013.01) | |
| *B60R 25/32* | (2013.01) | |
| *B60R 25/33* | (2013.01) | |
| *B60R 25/10* | (2013.01) | |
| *B60R 25/25* | (2013.01) | |
| *B60R 25/40* | (2013.01) | |

(52) U.S. Cl.
CPC .............. *B60R 25/20* (2013.01); *B60R 25/24* (2013.01); *B60R 25/25* (2013.01); *B60R 25/32* (2013.01); *B60R 25/33* (2013.01); *B60R 25/403* (2013.01); *B60R 2325/10* (2013.01); *B60R 2325/101* (2013.01); *B60R 2325/105* (2013.01); *B60R 2325/205* (2013.01)

(58) Field of Classification Search
CPC ....... B60R 25/25; B60R 25/403; B60R 25/20; B60R 2325/10; B60R 2325/105; B60R 2325/205; B60R 2325/101; B60R 25/243; B60R 2025/0415; B60R 16/023; B60R 16/033; B60R 25/34; B60K 28/10; F16H 63/3458; F16H 63/48; F16H 63/3416
USPC .............. 340/5.62, 10.5, 425.5, 5.61; 70/184
See application file for complete search history.

(56) References Cited

U.S. PATENT DOCUMENTS

| | | | |
|---|---|---|---|
| 5,828,297 A | 10/1998 | Banks et al. | |
| 6,095,310 A | 8/2000 | Voda et al. | |
| 6,107,937 A * | 8/2000 | Hamada | H04N 7/147 340/12.53 |
| 6,513,638 B2 | 2/2003 | Thyselius | |
| 6,589,134 B2 * | 7/2003 | Williams | B60W 30/18054 477/99 |
| 6,885,290 B2 | 4/2005 | Tsuji | |
| 7,161,467 B2 * | 1/2007 | Takahashi | B60R 25/24 340/12.51 |
| 7,484,613 B2 | 2/2009 | Kim et al. | |
| 8,219,289 B2 | 7/2012 | Kamada et al. | |
| 8,275,511 B2 * | 9/2012 | Kachouh | H04L 9/3271 701/36 |
| 8,281,681 B2 | 10/2012 | Kimura et al. | |
| 9,185,550 B2 * | 11/2015 | Yamane | B60R 25/24 |
| 9,421,945 B1 | 8/2016 | Smathers | |
| 9,649,999 B1 * | 5/2017 | Amireddy | H04W 4/40 |
| 2002/0100300 A1 | 8/2002 | Reeb et al. | |
| 2003/0075391 A1 | 4/2003 | Oppitz et al. | |
| 2004/0107028 A1 | 6/2004 | Catalano | |
| 2005/0155824 A1 | 7/2005 | Taba | |
| 2012/0016558 A1 * | 1/2012 | Ueno | B60R 25/08 701/51 |
| 2012/0041647 A1 | 2/2012 | Vujasinovic et al. | |
| 2015/0148990 A1 | 5/2015 | Patel | |
| 2015/0382160 A1 * | 12/2015 | Slay, Jr. | H04W 4/029 455/466 |
| 2017/0334393 A1 | 11/2017 | Hauslmann et al. | |

OTHER PUBLICATIONS

Written Opinion prepared by the U.S. Patent and Trademark Office dated Aug. 16, 2017, for International Application No. PCT/IB2017/053496.

International Preliminary Report on Patentability prepared by the U.S. Patent and Trademark Office dated Sep. 7, 2018, for International Application No. PCT/IB2017/053496.

International Search Report and Written Opinion prepared by the U.S. Patent and Trademark Office dated Apr. 15, 2017, for International Application No. PCT/IB2016/057538, 9 pages.

International Preliminary Report on Patentability prepared by the U.S. Patent and Trademark Office dated Aug. 23, 2018, for International Application No. PCT/IB2016/057538, 11 pages.

* cited by examiner

REMOTELY ACTIVATED VEHICLE ANTI-THEFT DEVICE

CROSS REFERENCE TO RELATED APPLICATIONS

This application is a national stage application under 35 U.S.C. 371 and claims the benefit of PCT Application No. PCT/IB2017/053496 having an international filing date of 13 Jun. 2017, which designated the United States, which PCT application claimed the benefit of South Africa Patent Application No. 2016/06093 filed 2 Sep. 2016; South Africa Patent Application No. 2016/06693 filed 28 Sep. 2016; and International Application No. PCT/IB2016/057538 filed 12 Dec. 2016, the disclosure of each of which are incorporated herein by reference.

FIELD OF INVENTION

This invention relates to vehicle security and, more specifically, to a remotely actuatable drivetrain locking mechanism for preventing theft of vehicles.

BACKGROUND OF INVENTION

Vehicle security is a multi-million rand industry. Many different theft deterrent devices have been developed over the years to prevent vehicle theft. Despite Inventors' best efforts vehicle theft is still rife in many countries and particularly so in South Africa. Many new vehicles come fitted with a sophisticated vehicle alarm system, immobiliser and/or GPS tracking unit. However, despite the inclusion of these devices and systems in vehicles, a large number of vehicles are still being stolen annually.

Although some stolen vehicles that were fitted with a tracking unit are recovered, often significant damage has already been done to the vehicle by thieves in an attempt to locate any possible tracking devices. Therefore, despite having recovered the stolen vehicle, repair costs are still exorbitant and many vehicle owners are reluctant to take a stolen and recovered vehicle back due to depreciation in its value.

Vehicle theft syndicates have found ways of breaking into vehicles and bypassing or disabling existing vehicle alarm systems within minutes. In some instances, the thieves carry a portable supplementary electronic control unit and remote with them, specific to the vehicle being targeted, which allows them to disconnect and bypass the vehicle's existing alarm/immobiliser system which is ordinarily accessible from the vehicle cabin. This means that they can quickly and relatively easily gain entry to the vehicle and bypass the existing vehicle alarm/immobiliser system by connecting the supplementary electronic control unit and drive off within minutes, minimising the possibility of being caught in the act.

US 2011/0193692 discloses an anti-theft system for a vehicle which comprises an access controller 20, a lock mechanism 21 including a steering shaft lock 40 and a hood lock 60 and an alarm unit 25. The system comprises a programmable processor 201 which is configured to actuate a drive unit 50 which is configured to move a lock rack 57 into and out of engagement with a limit unit 53 or toothed collar which is mounted to the steering shaft in order to prevent unauthorised turning of the steering wheel. The access controller 20 further includes a handbrake sensor 234 amongst others. In the drawings, a handbrake cable is illustrated which mechanically engages the lock rack 57 to prevent engagement thereof with the toothed collar when the handbrake is disengaged. The access controller 20 is enclosed in a housing 203 besides a steering column and distal steering wheel. A drawback of this system is that once a thief has gained access to the vehicle cabin, the steering shaft lock 40 can easily be tampered with, bypassed or physically broken into and damaged, destroyed or rendered inutile due to the fact that it is located at an easily accessible position adjacent to the steering column. The lock 40 may also be broken off using sheer force in order to free up rotation of the steering wheel.

U.S. Pat. No. 8,006,526 teaches a steering shaft lock actuator including at least one motor drivingly connected to a locking pawl and a housing for a least partially enclosing the motor, a drivetrain, the locking pawl and a locking pin. The drivetrain is configured linearly to urge the locking pawl and the locking pin between a locked position wherein the locking pawl and locking pin extend at least partially out of the housing and an unlocked position wherein the locking pawl and the locking pin are retracted toward the housing relative to the locked position. The locking pawl is positioned to prevent rotational movement of the steering shaft when in the locked position. A downside of the steering shaft lock actuator is that it is located within the vehicle cabin which is within reach of a driver or thief inside the cabin. This renders it susceptible to tampering or breakage through the use of force. Through the use of brute force the housing and mechanism can be broken off from the steering column once access has been obtained by removing dash or steering column panels.

U.S. Pat. No. 1,476,437 discloses a shaft locking means which operates purely mechanically in order to lock and unlock a steering shaft or other shafts. The steering shaft lock requires the use of a key inserted into a keyhole to lock and unlock the shaft locking means. When the key is turned, a locking pawl is moved into or out of engagement with a toothed collar around the shaft to be locked. One drawback is that the locking pawl only prevents rotation in one direction. The shaft locking means has the drawback of lack of integration with a vehicle's existing electronic alarm or control system and requires manual locking and unlocking through the use of a physical key.

Thieves have managed to bypass or otherwise disable most anti-theft mechanisms which are either directed toward disabling or preventing the use of peripheral driving controls of the vehicle such as the gear lever, pedals or steering wheel or immobilising the vehicle by electrically or electronically interrupting power supply to critical components such as pumps or motors in the event that predetermined alarm or start conditions are not satisfied. All of these devices or systems are installed upstream of the power plant or engine or drivetrain of the vehicle. Therefore, if the thief manages to supply the immobilised components with power directly, or manages to disable the anti-theft mechanisms themselves, the vehicle can be started. This is sometimes achieved by hot-wiring the fuel pump, for example, directly from the battery leads.

A couple of inventions of which the Applicant is aware have suggested devices which are to be installed downstream of the power plant or engine of the vehicle. A couple of them and their drawbacks have been discussed below.

U.S. Pat. No. 2,992,693 describes a drive shaft lock for an automobile which is designed automatically to engage when an operator opens a vehicle door without placing the transmission handle in the "park" position. This is to prevent vehicle runaway. A rod is configured to protrude through one of a number of holes formed in a periphery of a circular disc attached to the driveshaft. A speed governor opens a microswitch which prevents engagement of the rod when the vehicle is in motion. Power to the ignition switch is turned off when the vehicle door is opened. Unfortunately, this driveshaft lock is not suitable for use a theft-deterrent as the rod and disc are exposed and can easily be tampered with to prevent insertion of the rod into any of the holes or to retract the rod from the holes, if it had previously engaged the disc. Furthermore, the disc can easily be removed or loosened by removing the set screw.

U.S. Pat. No. 2,992,693 also does not teach integration of the system with an electronic vehicle alarm or control system which includes the use of a processor or electronic control unit.

U.S. Pat. No. 1,668,395 describes a shaft lock for an automobile. This locking device is designed to inter-engage the driveshaft of a vehicle at some point beyond the clutch so as to lock the rear wheels against forward motion without interfering with the operation of the engine or clutch. The locking device only prevents rotation in one direction when engaged with the driveshaft. A neck of the locking device projects through an opening in the floor of the passenger compartment and requires physical manipulation through rotation by hand in order to engage/disengage the locking device. Operation of the locking device is awkward and cumbersome and deters operators from using it.

U.S. Pat. No. 5,714,807 discloses an anti-theft device for a vehicle which is configured to lock a gear selector or lever in place for a vehicle having an automatic transmission and to lock a clutch pedal in a depressed position for a manual transmission vehicle. The device includes a push-pull gear motor which is configured to displace a pivotal locking device between locked and unlocked position. The invention includes a hand-held transmitter which is configured to actuate the motor to move the locking device between its positions. Signals sent by the transmitter to the anti-theft device may simultaneously operate an alarm or central locking. However, one drawback of this device is that, if a thief manages to gain possession of the transmitter, as in the event of a hijacking, the anti-theft device is rendered useless as the thief can use the hand-held transmitter to unlock the device.

US 2004/0201461 discloses a vehicle alarm and theft deterrent system for preventing vehicle theft that can be activated and deactivated remotely from a touch-tone phone. When the car is stolen, the owner can remotely activate a code using a pager or cell phone which disables the engine once the thief turns off the engine. A drawback of this system is that the code activates switches which interrupt power to the starter. However, a thief could easily circumvent these switches by supplying power directly to the starter.

Furthermore, the thief may have travelled a long distance before turning the engine off, or if aware of the system, may keep the engine running for as long as possible whilst the power interrupting switches are circumvented.

The Applicant has identified a need for a vehicle anti-theft device which overcomes the above drawbacks. The present invention aims to address the above problems, at least to some extent.

SUMMARY OF INVENTION

In accordance with a first aspect of the invention, there is provided an anti-theft device for a vehicle which includes a power plant and a drivetrain, the power plant being drivingly connected to the drivetrain in order to propel the vehicle, the anti-theft device having an unlocked state, a locked state and a priority locked state, the anti-theft device including:

a locking member which is mounted adjacent to the drivetrain, downstream of the power plant, and which is movable relative to the drivetrain between an open position, in which the anti-theft device is in its unlocked state, and in which a driveshaft or transmission of the drivetrain is permitted to rotate freely; and an engaged or locked position, in which the locking member prevents displacement of the driveshaft or transmission by locking it in position thus immobilising the vehicle;

an actuator which is configured to displace the locking member from one of its open or locked positions to the other;

an electronic control unit which is communicatively linked to the actuator in order to control actuation of the actuator, the electronic control unit also being configured to receive a motion signal indicative of movement of the vehicle; and at least one wireless communication module which is communicatively linked to the electronic control unit and is configured wirelessly to receive signals from first and second remote control devices and is configured to convey the signals received from the remote control devices to the electronic control unit, wherein, when the anti-theft device is not in its priority locked state, the electronic control unit is configured in response to receipt of a lock/unlock signal from the first remote control device to actuate the actuator in order to change the position of the locking member from one of its locked or open positions to the other, provided that the vehicle is not in motion or is moving at a rate which is below a predetermined threshold value; and, when the anti-theft device is in its priority locked state, the electronic control unit overrides any signals received from the first remote control device thus negating use of the first remote control device and giving priority to a priority signal received from the second remote control device.

When the anti-theft device is in its locked state or in its priority locked state, the locking member may be in its locked or engaged position.

The electronic control unit may be configured to change the state of the anti-theft device from either of its unlocked or locked states to its priority locked state in response to receipt of a priority lock signal from the second remote control device, provided that the vehicle is not in motion or is moving at a rate which is below the predetermined threshold value.

The electronic control unit may further be configured to actuate the actuator in order to move or allow movement of the locking member from its locked position to its open position and hence the anti-theft device to its unlocked state in response to receipt of a priority unlock signal from the second remote control device.

The anti-theft device may include a vehicle speed sensor. The speed sensor may be coupled to the electronic control unit. The speed sensor may be configured to detect a speed at which the vehicle is travelling, when in motion. The speed sensor may communicate the sensed speed to the electronic control unit in the form of the motion signal. The speed sensor may take on the form of an optical sensor. It may take on the form of an electromechanical sensor. It may take on the form of a magnetic sensor. It may take on the form of an electrical sensor. It may take on the form of a mechanical sensor. At least part of the speed sensor may be mounted to the drivetrain for rotation together with the drivetrain.

The electronic control unit, actuator and locking member may be housed within a tamper-proof casing, downstream of the power plant.

The electronic control unit, actuator, locking member and wireless communication module may be housed within a tamper-proof casing, downstream of the power plant.

The anti-theft device may include a GPS which is configured to determine a current geolocation of the anti-theft device. The GPS may be configured to communicate the geolocation to the electronic control unit or wireless communication module.

The wireless communication module may be configured to communicate the geolocation of the anti-theft device to the second remote control device. It may be specifically configured to do so when the anti-theft device is in its priority locked state.

The GPS may be housed within the tamper-proof casing. The speed sensor may be accommodated within the tamper-proof casing. A backup power supply configured to power the anti-theft device may be provided within the tamper-proof casing. The anti-theft device may be configured to notify a user of a low battery condition by forwarding a notification to the second remote control device via the wireless communication module. The backup power supply housed within the casing may be replaceable using special tools.

The wireless communication module may include a radio frequency receiver. The wireless communication module may also include a GSM modem. The GSM modem may be configured to communicate with the second remote control device via a cellular network.

The first remote control device may be separate and distinct from the second remote control device. The remote control devices may be configured to communicate with the wireless communication module using different communication standards. The first remote control device may be in the form of a hand-held radio frequency transmitter. The radio frequency transmitter may be configured to transmit lock/unlock signals to the radio frequency receiver.

The second remote control device may be in the form of a mobile communication device. The mobile communication device may be a smartphone. The mobile communication device may be configured to communicate with the GSM modem across the cellular network.

The locking member may be separate and distinct from a braking system of the vehicle.

When in its locked position, the locking member may engage the driveshaft or transmission. The locking member may thus prevent relative angular displacement of a latter portion of the driveshaft or transmission.

Once a lock signal has been received from one of the remote control devices and the electronic control unit detects that the vehicle is moving at a speed greater than the predetermined threshold value, the anti-theft device may be primed to lock. Accordingly, as soon as the vehicle's speed is reduced to below the predetermined threshold value, the electronic control unit automatically actuates the actuator in order to move the locking member into its locked position.

The locking member may include a locking pawl. The locking member may be pivotally displaceable relative to a toothed rotor of the drivetrain of the vehicle.

The locking pawl may have a head which is profiled to mate with a periphery of the toothed rotor when in its locked position, in order to prevent rotation of the drivetrain.

The tamper-proof casing may be a transmission casing. Alternatively, the tamper-proof casing may be a rigid, secure box mounted below the vehicle adjacent to the drivetrain.

Due to profiling of the head of the pawl and the toothed rotor, the pawl is unable to engage the rotor whilst it is rotating at a velocity beyond a predetermined engagement threshold velocity. The actuator may be in the form of an electrically driven worm gear. The actuator may include a spring-loaded pin. The pin may be slidably displaceable within a sleeve or guide between extended and retracted positions. The worm gear may be configured to displace the pin. The pin may be configured to urge the pawl into engagement with the toothed rotor.

The invention extends to a system for preventing vehicle theft, the system including
  at least one vehicle which includes a power plant and a drivetrain, the power plant being drivingly connected to the drivetrain in order to propel the vehicle;
  an anti-theft device having an unlocked state, a locked state and a priority locked state, the anti-theft device including:
    a locking member which is mounted adjacent to the drivetrain, downstream of the power plant, and which is movable relative to the drivetrain between an open position, in which the anti-theft device is in its unlocked state, and in which a driveshaft or transmission of the drivetrain is permitted to rotate freely; and an engaged or locked position in which the locking member prevents displacement of the driveshaft or transmission by locking it in position thus immobilising the vehicle;
    an actuator which is configured to displace the locking member from one of its open or locked positions to the other;
    an electronic control unit which is communicatively linked to the actuator in order to control actuation of the actuator, the electronic control unit also being configured to receive a motion signal indicative of movement of the vehicle; and
    at least one wireless communication module which is communicatively linked to the electronic control unit;
  a first remote control device configured wirelessly to transmit lock/unlock signals to the wireless communication module; and
  a second remote control device, separate from the first remote control device, configured wirelessly to communicate with the wireless communication module, wherein the wireless communication module is configured to convey the signals received from the remote control devices to the electronic control unit,
  wherein, when the anti-theft device is not in its priority locked state, the electronic control unit is configured in response to receipt of a lock/unlock signal from the first remote control device to actuate the actuator in order to change the position of the locking member from one of its locked or open positions to the other, provided that the vehicle is not in motion or is moving at a rate which is below a predetermined threshold value; and, when the anti-theft device is in its priority locked state, the electronic control unit overrides any signals received from the first remote control device thus negating use of the first remote control device and giving priority to a priority signal received from the second remote control device.

The invention also extends to a method of controlling a system for preventing vehicle theft as described above, the method including:
  sensing, using a speed sensor, motion of the vehicle; and
  actuating the actuator in order to move the locking member into its locked position in response to receipt of a lock signal from either of the first or second remote control devices by the electronic control unit, provided that the vehicle is not in motion or is moving at rate which is below a predetermined threshold value.

The method may include:

prioritising, using the electronic control unit, the priority signal received from the second remote control device by ignoring signals received from the first remote control device when the anti-theft device is in its priority locked state.

BRIEF DESCRIPTION OF DRAWINGS

The invention will now be further described, by way of example, with reference to the accompanying diagrammatic drawings.

In the drawings.

DETAILED DESCRIPTION OF AN EXAMPLE EMBODIMENT

Figure 1:
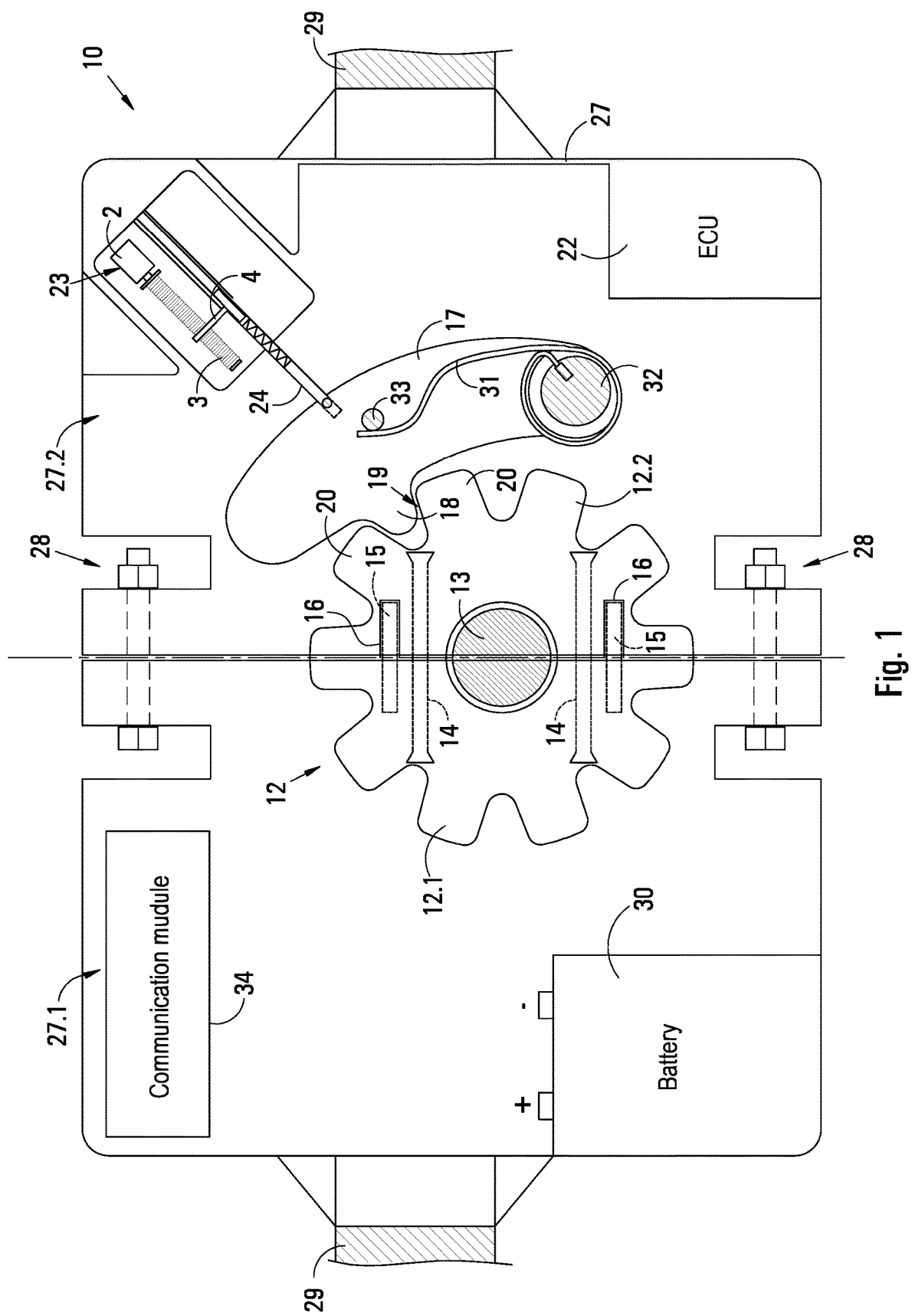
FIG. 1 shows a cross-sectional view through a driveshaft to which a vehicle anti-theft device in accordance with the invention has been fitted.

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

The term "drivetrain" should be understood to mean the group of components that deliver power to the driving wheels including a vehicle transmission, couplings, driveshaft or propeller shaft, arms and rods. The term "transmission" should be understood to include a vehicle gearbox and differential.

In the figures, reference numeral 10 refers generally to a remotely activated vehicle anti-theft device which is intended to prevent vehicle theft. The device 10 which may also be referred to as a drivetrain or driveshaft lock is fitted to a drivetrain of the vehicle, downstream of or after a power plant which is drivingly connected to the drivetrain. In the example embodiment illustrated in the drawings, the anti-theft device 10 is mounted adjacent to a driveshaft of the drivetrain, downstream of a vehicle transmission or gearbox. It will be appreciated, however, that the device 10 may be accommodated wholly, or at least in part, within the vehicle transmission. Therefore, the device 10 and its constituent components may be housed within a transmission casing. Accordingly, the device 10 may be incorporated into a gearbox or differential of the vehicle. The device 10 may be fitted retrospectively as an after-market product. Preferably, however, the device 10 can be installed upon manufacture and assembly of the vehicle. The Applicant believes that conventional alarm systems which are configured to immobilise a vehicle by interrupting power to electrical components of either the ignition or starter are easier to bypass than when a physical, concealed lock has been applied to the drivetrain of the vehicle. Especially so, if the lock has been applied to a latter portion of the drivetrain. In other words, despite the use of mechanical locks to prevent functioning of vehicle controls such as pedals, gear levers or a steering wheel, for example, it is still possible to steal the vehicle by towing it away. The present invention aims to overcome this drawback. It is also desirable to be able remotely to activate/deactivate the device 10 using at least two separate remote control devices, in the event that one of the remote control devices are stolen together with the vehicle.

In an example embodiment of the device 10, in accordance with the invention, illustrated in the drawings, a drivetrain of the vehicle is provided with a toothed rotor or gear 12 which is mounted around a drive or prop shaft 13 of the vehicle, downstream of a clutch, for rotation together with the driveshaft 13 about a shaft axis. In a configuration illustrated in FIG. 1, the anti-theft device 10 is retrofitted to the vehicle. The scope of the invention also extends to an anti-theft device which is fitted upon assembly of the vehicle.

The gear 12 comprises two parts 12.1, 12.2 which are mounted around the driveshaft 13 and secured thereto using set screws 14. In order to ensure accurate fitment or location of the parts 12.1, 12.2, the parts may include complementary locating formations. To this end, one part 12.1 includes one or more male mating formations in the form of protruding pins 15 and the corresponding part 12.2 includes complementary female mating formations in the form of sockets 16. The set screws 14 may be countersunk into the gear 12.

The toothed gear 12 is annular and may have keyways (not shown) which can be axially slid over splines in the shaft 13 in order to mount the gear 12 thereto. Alternatively, the gear 12 may be integrally formed with the driveshaft 13 upon or after manufacture. The device 10 further includes a locking member. The locking member may be in the form of a pivotally mounted locking pawl 17. The locking member may also take on other forms. For example, the locking member may be in the form of a clamp having opposed jaws which is configured frictionally to engage the propeller shaft 13. Alternatively, the locking member may take the form of a dog gear (not shown). Furthermore, the locking member may take on the form of a dog clutch (not shown).

The locking pawl 17 is pivotally displaceable relative to the toothed gear 12 between an open position (not shown) and a locked or engaged position (see FIG. 1). When the locking pawl 17 is in its open position, the driveshaft 13 is free to rotate. In its open position, a profiled head 18 of the pawl 17 is spaced away from a radially outer periphery of the gear 12 such that the gear 12 is permitted to rotate freely together with the driveshaft 13. In its locked position, shown in FIG. 1, the locking member (locking pawl 17) engages the driveshaft 13 and prevents rotation thereof, hence immobilising the vehicle. Here the profiled head 18 of the pawl 17 engages the gear 12 and is received within a space 19 defined between adjacent teeth 20 of the gear 12 and prevents rotation of the gear 12, thereby locking the driveshaft 13 in position. Therefore, with the locking member (locking pawl 17) in its locked position, at least a latter part of the drivetrain coupled to driven wheels of the vehicle is immobilised.

The anti-theft device 10 further includes an actuator 23 and an electronic control unit 22 which is communicatively linked to the actuator 23. In the example embodiment illustrated in the drawings, the actuator 23 is in the form of an electrically operated linear actuator having an extendable/retractable pin 24 or plunger. The pin 24 is spring loaded and is configured to bear against a rear face of the locking pawl 17 in order to urge it into engagement with the gear 12. The actuator 23 includes an electric motor 2. The electric motor 2 is drivingly connected to a screw threaded rod 3 or worm gear. A screw-follower 4 which is connected to the pin 24 engages the rod 3 such that rotation of the rod 3 in one direction or in the other, linearly extends or retracts the pin 24. The actuator 23 does therefore not draw power in order to maintain the pin 24 in one of its retracted or extended positions. In FIG. 1, the pin 24 is shown in an extended position. The actuator 23 may also take on the form of a solenoid (not shown).

The electronic control unit 22 is communicatively linked to the actuator 23 and is configured to actuate the actuator 23 when needed, i.e. when the device is to be locked or unlocked. The pin 24 is slidably displaceable within a guide or sleeve between its extended and retracted positions in response to rotation of the rod 3 or worm gear by the motor 2. In this manner, the pin 24 and hence the locking pawl 17 can be passively held in its extended position or locked position, as shown in FIG. 1, without requiring application of power or energy to maintain the pawl 17 in the locked position, as would be the case with the use of a solenoid.

The electronic control unit (ECU) 22 includes a processor which may be in the form of a microprocessor which is configured to receive as input a motion signal derived from a speed sensor 7 indicative of whether the vehicle is in motion, and if so, at what speed it is moving. Accordingly, the ECU 22 is configured to receive the motion signal indicative of whether or not the drivetrain is in motion. This motion signal is derived from the speed sensor 7. The speed sensor 7 may take the form of any suitable speed sensor. In other words, it may be an optical, electromechanical, mechanical, magnetic or electrical sensor. The speed sensor 7 may be coupled to a driveshaft to check whether or not it is rotating. The speed sensor 7 may be provided in the vehicle transmission. The speed sensor 7 may be provided a tamper-proof casing 27. Alternatively, the motion signal may also be derived from a GPS 6. Preferably the motion signal is in the form of electrical input signal or voltage signal which is fed as input to the microprocessor (ECU) 22 (see FIG. 2).

Figure 3:
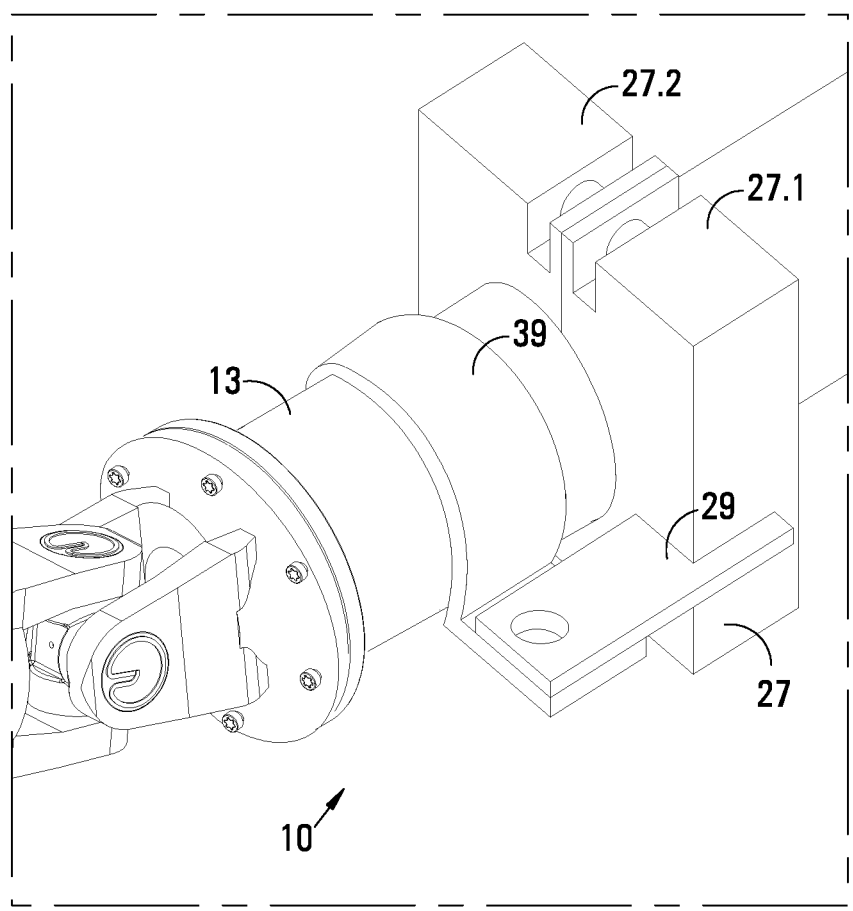
FIG. 3 shows a three-dimensional view of a driveshaft to which the anti-theft device of FIG. 1 has been mounted.

In order to restrict access to the gear 12 and especially to the locking pawl 17, these two components, together with the other components of the device 10 such as the actuator 23, ECU 22, speed sensor 7 and GPS 6 are enclosed in the robust, secure, tamper-proof casing 27. In one version, the casing 27 may be a transmission, differential or gearbox casing of the vehicle. Alternatively, the casing 27 may be separate and distinct from the transmission casing. The casing 27 may be retrofitted to a vehicle. Accordingly, the casing 27 may be mounted to an underside of the vehicle around the driveshaft 13. In this instance, the casing 27 is located proximate a centre bearing support 39 (see FIG. 3) of the drivetrain by way of brackets 29. Accordingly, the driveshaft 13 effectively passes through the casing 27, the casing 27 wrapping around the shaft. To this end, the casing 27 comprises two halves or parts 27.1, 27.2 which are secured together using obscured or concealed bolts and nuts 28. Lock nuts and bolts 37 (see FIG. 4) which require the use of a special key or adapter to loosen or tighten are preferably used to secure the parts of the casing 27 together to prevent unauthorised removal thereof. The casing 27 is held in place by a number of the mounting brackets 29 which extend away from the casing 27 and are attached to centre bearing mountings.

During normal use, the electrical components of the device 10 are powered from the vehicle power supply (not shown). However, the device 10 further includes a back-up power supply or battery 30 which is also housed within the casing 27 to provide back-up power when power from the vehicle power supply is interrupted for whatever reason. This also renders an attempt to tamper with the device 10 by cutting off its power supply derived from the vehicle power supply ineffective.

In order to prevent accidental or unintentional engagement of the locking pawl 17 with the gear 12 whilst the vehicle is in motion or the driveshaft 13 is rotating, the pawl 17 is spring biased to its open position using a spring 31. One end of the spring 31 is coiled around and connected to a journaled pivot axle 32 which is connected to the casing 27. An opposite end of the spring 31 bears against or engages a protruding arm 33 of the pawl 17 and urges it into its open position. The casing 27 has opposing apertures (not shown) which are sized to accommodate the driveshaft 13. Faces of adjacent teeth 20 of the gear 12 that define the spaces 19 between them and the head 18 of the pawl 17 are purposefully shaped such that the head 18 cannot engage the gear 12 when the gear 12 is rotating above a threshold angular velocity or speed. This serves as an additional safety mechanism, as engagement of the pawl 17 whilst the gear 12 is rotating at high speed could cause significant mechanical damage or failure of the components of the device 10. Vehicle speed sensed by the speed sensor 7, in communication with the ECU 22, must be below the predetermined threshold value as a precondition to actuation of the actuator 23 in order to prevent engagement of the locking member whilst the driveshaft is rotating too quickly.

The spring-loaded pin 24 will ensure engagement of the pawl 17 with the gear 12 once the gear 12 rotates in any direction, in the event that the head 18 of the pawl 17 is misaligned with the spaces 19 between the teeth 20 of the gear 12 when the device 10 is locked.

An important feature of the anti-theft device 10 is that it is configured to be remotely activated or deactivated, i.e. locked or unlocked. If a lock signal is received and the vehicle is moving at a speed above the predetermined threshold value then the device 10 is primed to lock. In other words, once primed to lock, the ECU 22 will initiate actuation of the actuator 23 in order to move the locking member 17 to its locked position (FIG. 1), as soon as the speed of the vehicle sensed by the speed sensor 7 falls below the predetermined threshold value.

Figure 2:
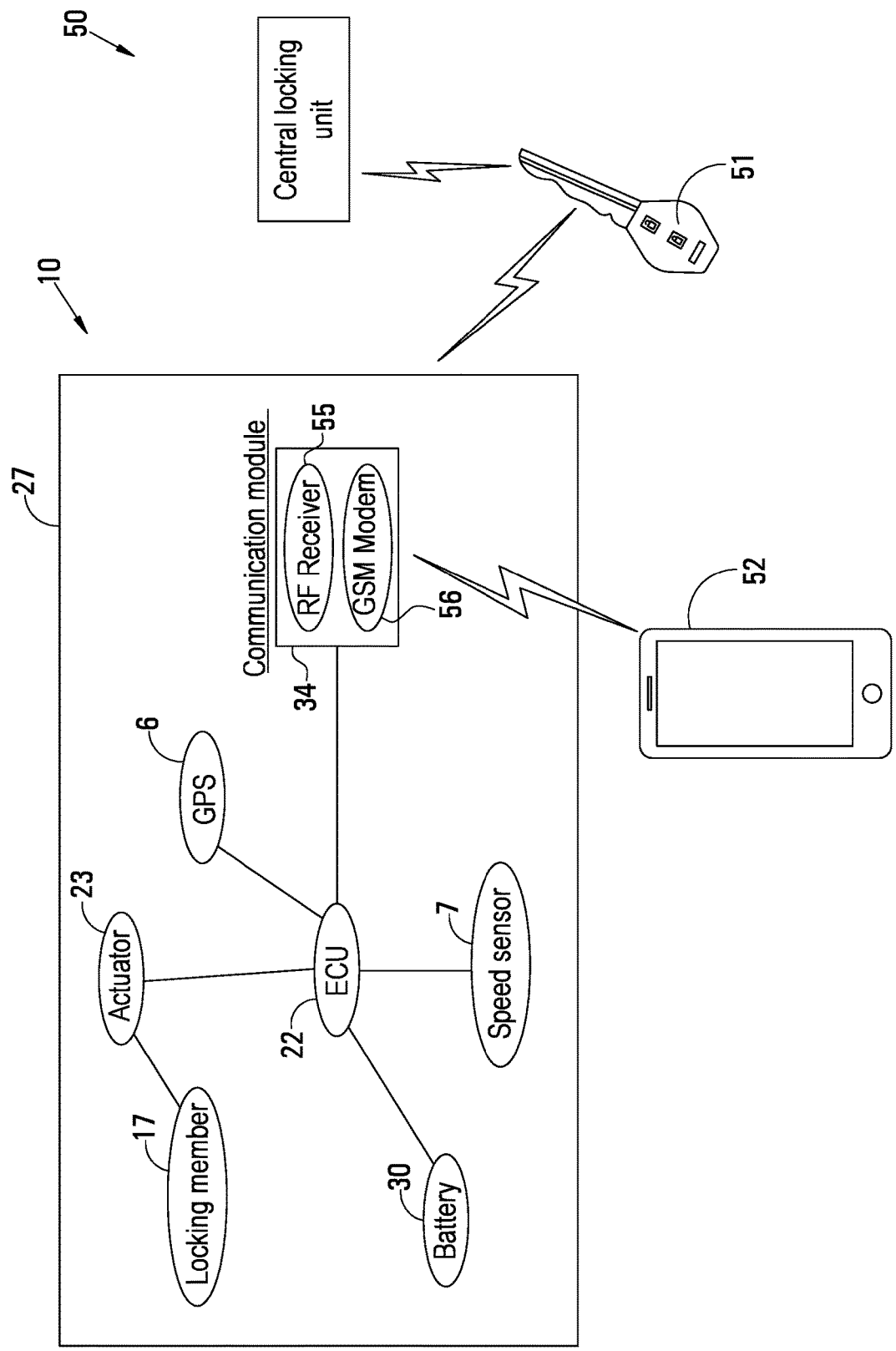
FIG. 2 shows a conceptual block diagram of a system for preventing vehicle theft including the vehicle anti-theft device.

To facilitate remote activation or remote control, the device 10 includes at least one communication module 34 (see FIG. 2). The module 34 is in the form of a wireless communication module which is communicatively linked to the electronic control unit 22 (see FIG. 2). Alternatively, the module 34 may form part of the electronic control unit 22, i.e. be integrated with the electronic control unit 22. In order to prevent tampering, the communication module 34 is preferably also accommodated within the casing 27.

A system 50 for preventing vehicle theft, illustrated in FIG. 2, includes the anti-theft device 10 fitted to a vehicle and a first remote control device 51 and a separate second remote control device 52. Both the first and second remote control devices 51, 52 are wireless remote control devices. Both remote control devices 51, 52 are configured to control operation of the anti-theft device 10 by transmitting signals to the communication module 34. The first and second remote control devices 51, 52 communicate with the communication module 34 using different communication standards. In this example embodiment, the first remote control device 51 is a hand-held radio frequency transmitter such as a conventional wireless vehicle remote. The second remote control device 52 is a mobile communication device or cellular telephone. The second remote control device 52 may be a smartphone. The first remote control device 51 may take the form of a vehicle remote and key combination which is ordinarily used to activate/deactivate the vehicle's central locking unit etc.

Both devices 51, 52 are configured to communicate with the communication module 34 of the anti-theft device 10. The first remote control device 51 is configured to transmit radio frequency signals to the communication module 34. To this end, the communication module 34 includes a radio frequency (RF) receiver 55. The communication module 34 also includes a GSM modem 56. The mobile device 52 can therefore communicate, i.e. send and receive signals to/from the communication module 34 via a cellular communication network. The RF receiver 55 is configured to receive lock/unlock signals from the vehicle remote (first remote control device) 51. The signals transmitted by the vehicle remote 51 may be the same signals used to operate the central locking unit of the vehicle. In an alternative arrangement, the central locking unit or control unit of the vehicle may be configured to forward or relay lock/unlock signals received from the vehicle remote 51 to the electronic control unit 22 of the anti-theft device 10. These signals can be relayed either wirelessly or by way of wired connection. Wireless communication is preferred though as it is less susceptible to tampering. The communication module 34 may therefore be indirectly linked to the first remote control device 51 via another component. The remote control device 52 communicates priority lock/unlock signals to the communication module 34 via the cellular network. The priority lock/unlock signals may take the form of a text message, such as a numerical code: "4532", for example, a voice message, instant message or any other suitable user input, input into the remote control device 52. The smartphone 52 may also have a purpose-built mobile application installed thereon for the purposes of activating/deactivating or locking/unlocking the anti-theft device 10.

Figure 6A:
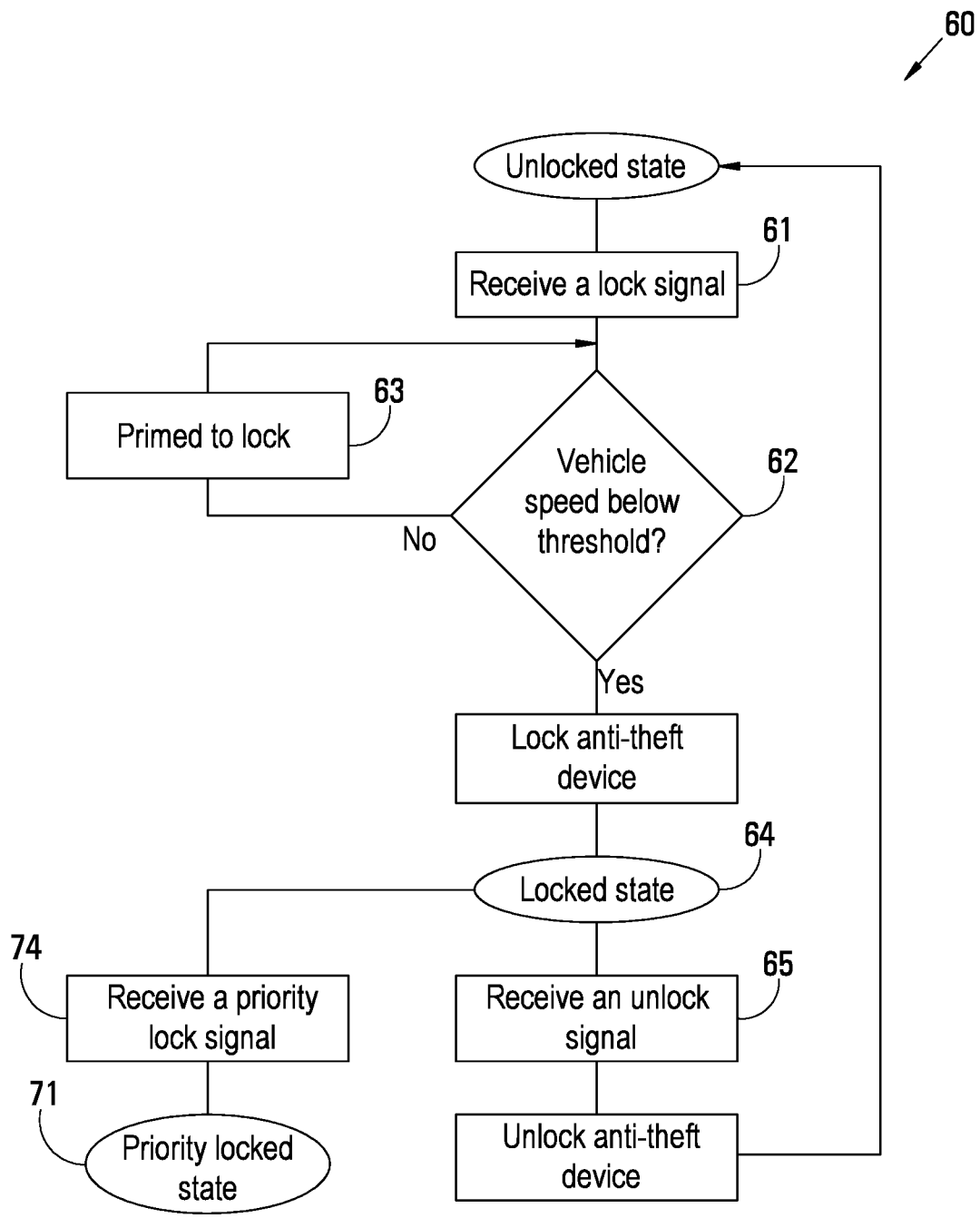
FIGS. 6A and 6B show flow diagrams of locking/unlocking sequences of the anti-theft device.

The anti-theft device 10 is configured to be moved between three different states, namely an unlocked state, a locked state and a priority locked state. In FIG. 6A, numeral 60 illustrates a conventional locking/unlocking sequence of the anti-theft device 10 initiated using the vehicle remote control 51. In its unlocked state, the locking member, i.e. locking pawl 17 is in its open position in which the drivetrain is permitted to rotate freely. With the anti-theft device 10 in its unlocked state, the vehicle can be driven unfettered. After a driver has gotten out of the vehicle he presses the lock button on the vehicle remote control 51. The RF receiver 55 receives a lock signal 61 and relays it to the ECU 22. Prior to actuating the actuator 23 in order to move the locking member into is locked position, the ECU 22 checks 62 whether the vehicle is stationary or at least moving at a rate which is below the predetermined threshold value. If the driveshaft of the vehicle is rotating at a rate above the threshold value then the device 10 is effectively primed to lock 63. In other words, the ECU 22 continuously or intermittently senses the vehicle's speed using the speed sensor 7 in order to establish when it drops below the predetermined threshold value. As soon as the speed drops below this value, the ECU 22 actuates the actuator 23 to move the locking member 17 into its locked position. Naturally, if the driver had just parked the vehicle, it would be stationary and the locking member 17 would be moved into its locked position by the actuator 23. The anti-theft device 10 is now in its locked state 64 in which the locking member 17 engages the driveshaft, as described above, therefore immobilising the vehicle. In this condition, the vehicle cannot be towed, as the wheels are unable to rotate. If, whilst the anti-theft device 10 is in its locked state 64, it receives via the communication module 34 a priority lock signal 74 from the second remote control device 52, then the state of the anti-theft device 10 changes to its priority locked state 71.

Assuming a priority lock signal was not received and the anti-theft device 10 is still in its locked state 64 when the driver returns to the vehicle, then he simply presses the unlock button on the remote 51. The RF receiver 55 receives 65 a wireless unlock signal and relays it to the ECU 22 which actuates the actuator 23, retracting the pin 24 which in turn allows movement of the locking member 17 into its open position under influence of the spring 31, in which the driveshaft can rotate freely again. The device 10 is now in its unlocked state again. The same unlock signal transmitted by the remote 51 simultaneously unlocks the vehicle's central locking unit. A single vehicle remote 51 can therefore be used to gain entry to the vehicle. The driver then starts the vehicle and drives off, the locking member 17 remaining in its open position.

Figure 6B:
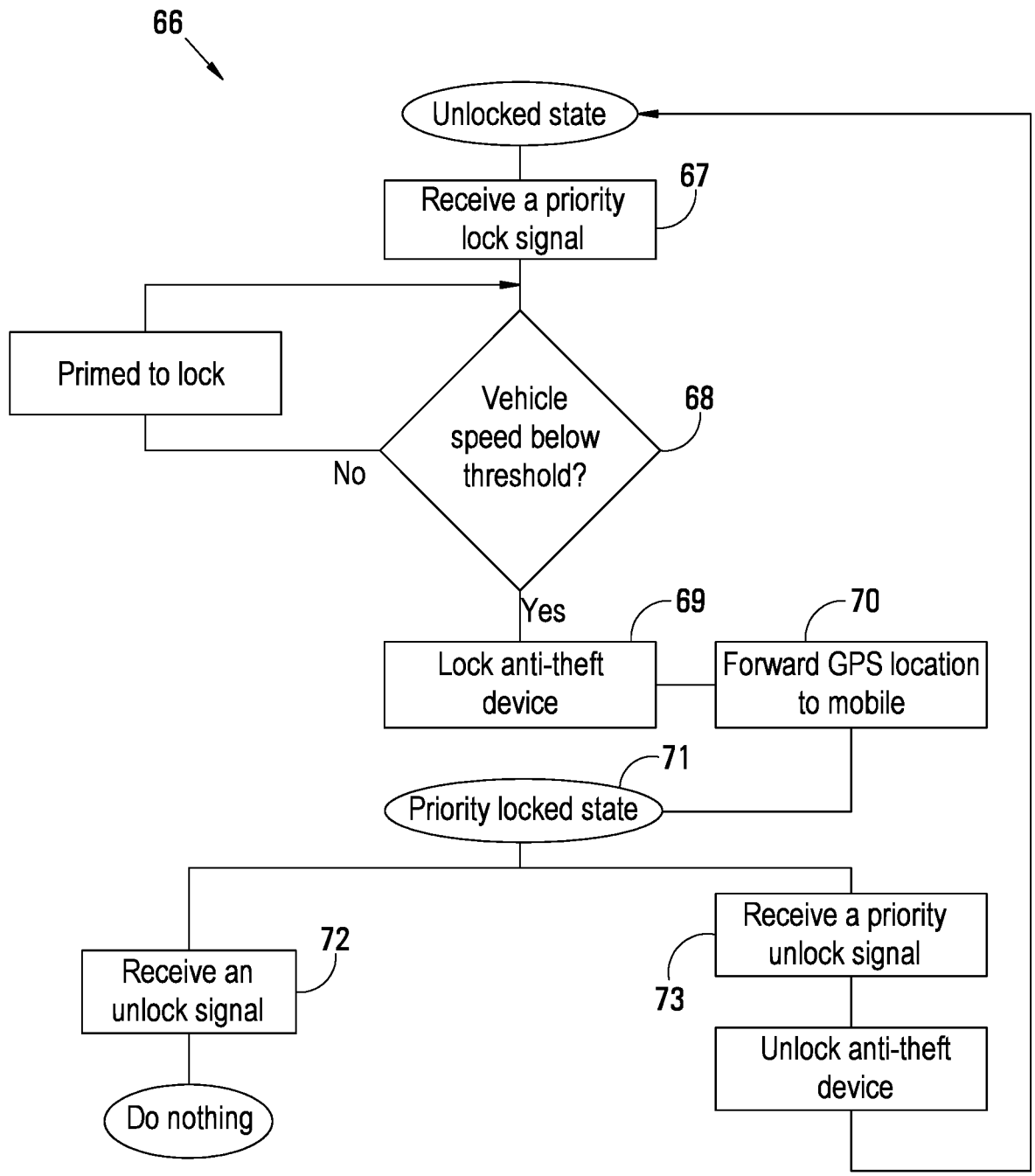

In the unfortunate event of a carjacking or hijacking, the driver may be forced from the vehicle and one or more perpetrators may drive off with the vehicle remote control 51 in the ignition. The thief can then manipulate the anti-theft device 10 using the vehicle remote 51 as needed to lock/unlock the device 10. By way of the GPS 6, a geolocation of the anti-theft device 10 is determined and communicated to the ECU 22. This can be done continuously or intermittently. As mentioned previously, the GPS 6 is preferably housed within the casing 27 to prevent tampering. It is precisely to address the abovementioned carjacking problem that the system 50 includes the second remote control device (mobile phone or smartphone) 52 configured to communicate with the anti-theft device 10 via the cellular communication network. Referring now to FIG. 6B, numeral 66 indicates a priority locking/unlocking sequence of the anti-theft device 10 using the second remote control 52. Whilst the vehicle is being driven by the perpetrators, the anti-theft device 10 is in its unlocked state. The owner, using either his own mobile phone 52, or any other mobile phone in the event that his was stolen alone with the vehicle, transmits a priority lock signal to the anti-theft device 10 via the cellular network. This priority lock signal can take any suitable form. Such as a unique code sent as a text message, voice message or an encoded data signal transmitted to the GSM modem 56 of the anti-theft device 10. Upon receipt of the priority lock signal 67, the communication module 34 communicates it to the ECU 22. The ECU 22 first checks 68 whether the vehicle speed is below the predetermined threshold value before actuating the actuator 23 in order to move the locking member 17 into its locked position. Once again, whilst the vehicle continues to move at a rate above the threshold value, the anti-theft device 10 remains primed to lock such that as soon as the ECU 22 detects via the speed sensor 7 that the speed of the vehicle has dropped below the threshold value, the anti-theft device is locked 69 by moving the locking member 17 into its locked position. Delayed activation of the locking member 17 until the vehicle has decelerated avoids a potentially unsafe driving condition. For example, it would be unsafe for a vehicle remotely to be brought to a halt in the middle of a free flowing highway. In other words, as soon as the vehicle slows down to stop at a traffic light or for any other reason, the locking member 17 engages the driveshaft, locking it in position and hence immobilising the vehicle. At this point, the GPS location of the anti-theft device 10 is communicated 70 to the owner's mobile phone 52 via the GSM modem 56. Preferably the GPS location is sent to the phone 52 from which the priority lock signal was received. Alternatively or in addition, the GPS location may be sent to one or more other designated mobile devices. The anti-theft device 10 is now in its priority locked state 71 in which the locking member 17 engages the driveshaft and prevents rotation thereof.

In its priority locked state 71, the ECU 22 of the anti-theft device 10 overrides or ignores any unlock signals received 72 from the vehicle remote 51 via the RF receiver 55. The vehicle can then be recovered by sending a response unit to the current GPS location of the anti-theft device 10. The perpetrators can therefore not unlock the anti-theft device 10 using the vehicle remote 51. Any attempt to bypass or tamper with the device 10 is prevented by the tamper-proof casing 27 housing the critical components. It is to be appreciated that, if the vehicle is moved, for example using a low-bed truck, authorities will still be able to track it down by tracking the device's GPS location. Once the vehicle has been recovered, the owner sends a priority unlock signal using the mobile phone 52. The GSM modem 56 receives the priority unlock signal 73 and communicates it to the ECU 22 in response to which the ECU 22 actuates the actuator 23 in order to move the locking member 17 to its open position. The anti-theft device 10 is now in its unlocked state again in which it is operative to receive commands from the vehicle remote 51. The system 50 may be designed such that, when the anti-theft device 10 is in its locked state 64, it is responsive to the priority unlock signal received from the second remote control device 52 to unlock the device 10. Alternatively, the system 50 can be set up such that the device 10 ignores the priority unlock signal from the second remote control device 52 when the anti-theft device 10 is in its locked state 64.

Although this has not been illustrated, it is conceivable that the first remote control device may take the form of an RFID tag, or proximity sensor.

The GPS 6 may serve as a satellite tracking unit. Accordingly, commands may be sent to and received from the device 10 via a satellite and/or cellular communication network via the communication module 34 which is coupled to the electronic control unit 22 of the device 10. The GPS is securely housed within the casing 27 where it cannot be reached, removed or tampered with. Furthermore, the communication module 34 may include any one selected from the group comprising a satellite transceiver, Bluetooth module, RFID transceiver, Wi-Fi module or any other suitable wireless communication module. Furthermore, the device 10 may include a biometric reader (not shown), e.g. fingerprint reader which is configured to authenticate a user prior to deactivating/unlocking the device 10 when in its priority locked state 71.

When the locking member is in its locked position, the pawl 17 engages the gear 12 under influence of the pin 24 and therefore prevents rotation of the driveshaft 13 which means the rear wheels of the vehicle cannot rotate. This effectively immobilises the vehicle. Even if a thief manages to start the vehicle, he won't be able to drive away because the driveshaft 13 is fixed or locked in position by the pawl 17. The device 10 is also effective against towing as the front wheels are generally suspended to tow a vehicle which means the rear wheels need to be able to rotate to tow the vehicle. In this instance, the vehicle cannot be towed away whilst the device 10 is engaged because the rear wheels cannot rotate freely.

When in its locked state 64 and an unlock signal is received 65 from the remote control 51, the electronic control unit 22 communicates with the actuator 23 in order to retract the pin 24 which allows the pawl 17 to be pivotally displaced away from the gear 12 under the influence of the spring 31. The driveshaft 13 can then rotate freely again. In the event that the vehicle is stolen because the device 10 was not engaged, an owner or service provider could, at the request of the owner, prime the device 10 to lock by remotely communicating the priority lock signal to the electronic control unit 22 via the communication module 34 housed within the casing 27 using the mobile phone 52 as described above. As mentioned, when the owner locks his vehicle using his vehicle remote control 51, the anti-theft device 10 is simultaneously locked. An indicator in the form of a light is provided inside the cabin of the vehicle to indicate to the driver when the device 10 is engaged or locked. The anti-theft device 10 may further be configured to warn a driver who attempts to start the vehicle that the device 10 is locked to prevent damage to the drivetrain or clutch. The anti-theft 10 may also prevent the vehicle from starting when in its locked or priority locked states to prevent damage to the drivetrain. Furthermore, unlocking of the device 10 may be a condition for the vehicle to start. In other words, the vehicle won't start until the device 10 is in its unlocked state. The Applicant believes that the provision of two remote control devices 51, 52 is advantageous. The first remote control device 51 is configured to lock/unlock the device 10 by way of medium to short range communication. The second remote control device 52, on the other hand, is configured to lock/unlock the device 10 by way of long range communication, i.e. via cellular communication. Furthermore, priority lock/unlock signals received from the second remote control device 52 (mobile phone) enjoy priority over, or override lock/unlock signals received from the first remote control device 51. Accordingly, once the anti-theft device 10 has been locked using the second remote control device 52, attempted use of the short range first remote control device 51 to unlock the anti-theft device 10 is negated.

Figure 4:
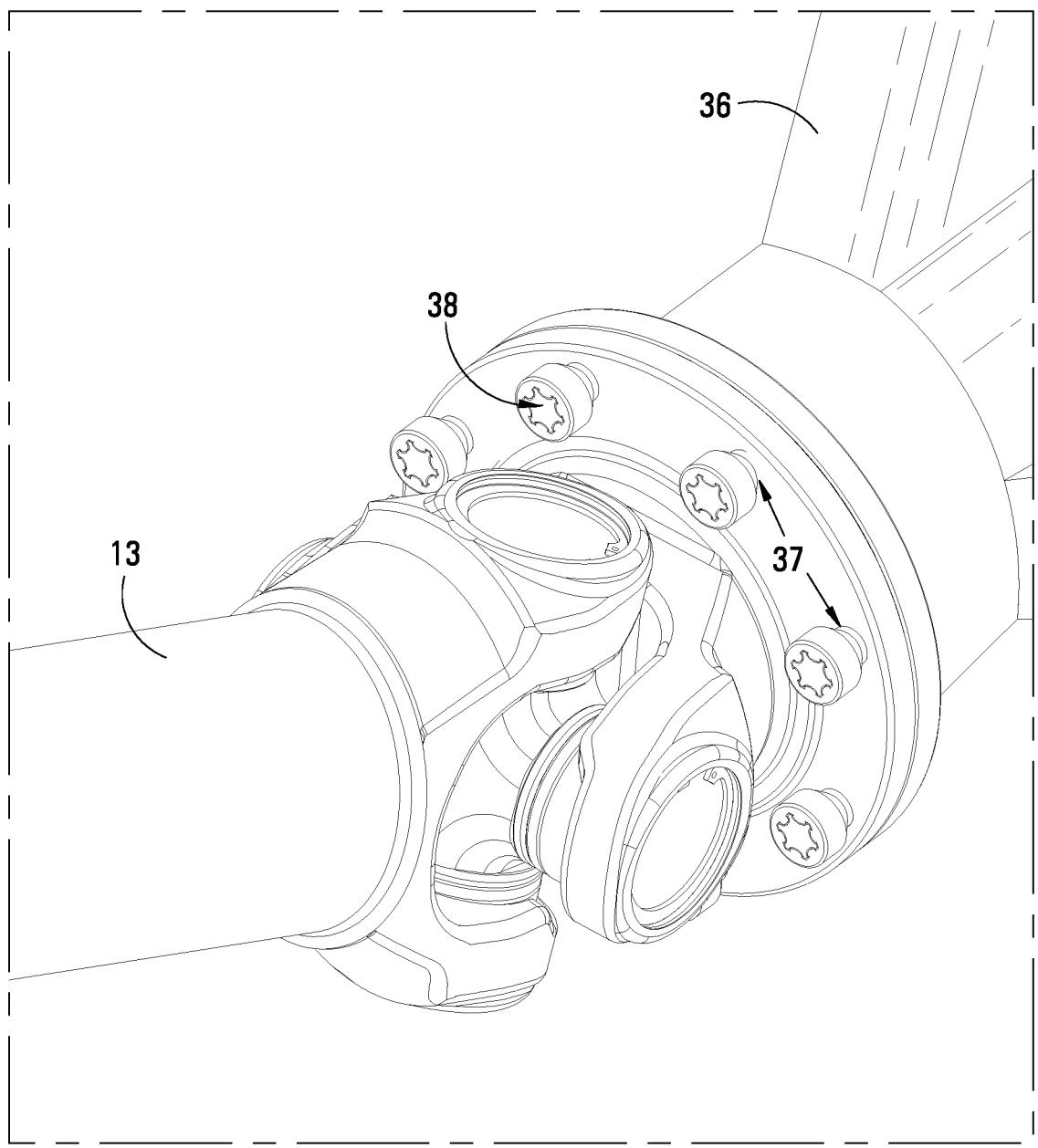
FIG. 4 shows a three-dimensional view of a coupling of a rear end of the driveshaft to a differential unit.
Figure 5:
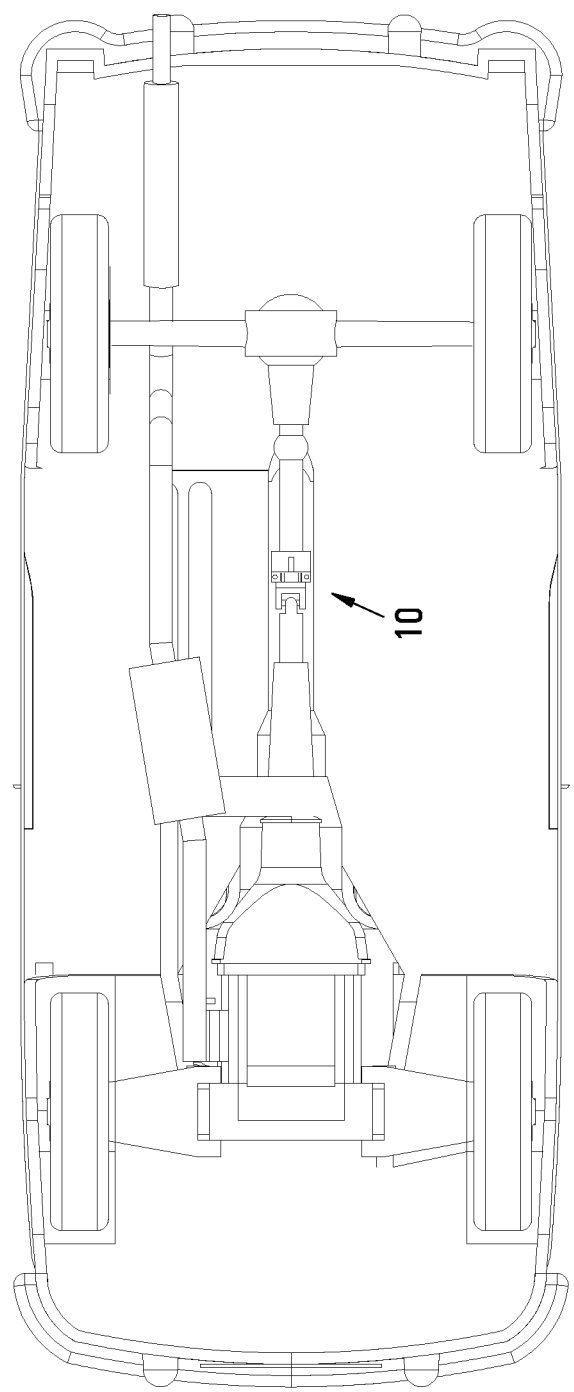
FIG. 5 shows an underside of a vehicle to which the anti-theft device of FIG. 1 has been fitted.

Turning now to FIG. 4, in order to prevent unauthorised disconnection of the driveshaft 13, conventional fasteners used to secure the driveshaft 13 to a differential unit 36, are replaced with a number of specialised keyed lock nuts and bolts 37. The bolts have a specialised head 38 which defines an unusual socket which cannot be accessed or engaged using a normal spanner. The nuts have a similar head which necessitates the use of a purpose-built key in order to tighten or loosen the nuts. In this way unauthorised disconnection of the prop shaft from the differential is prevented. The same lock nuts and bolts may be used to secure the casing 27 as well as central and fore linkages of the driveshaft 13 with the remainder of the drivetrain. Unauthorised disconnection of the prop shaft downstream of the device 10 would effectively bypass the device 10 because it would free up rotation of the rear wheels of the vehicle which would allow towing.

The robust metal casing 27 of the device 10 is located below the vehicle which means access to it is restricted unlike a steering shaft lock which can easily be tampered with or physically broken due to the fact that it is located at an easily accessible location adjacent to the steering column. In the embodiment of the invention in which the components of the anti-theft device 10 including the pawl 17 are enclosed in a transmission housing or casing, it is even more difficult for a thief to gain access to it. Generally a hoist or jack is required to gain access to parts located below the vehicle. Furthermore, the casing 27 prevents tampering with the components of the device 10 itself such as the actuator 23, gear 12, pawl 17, electronic control unit 22, GPS 6, speed sensor 7 and communication module 34. Remote electronic/electrical actuation of the actuator 23 in order to lock or unlock the device 10 makes the device simple to use because it does not require manual manipulation to engage and disengage the locking member. Furthermore, the communication module 34 enables remote control of the device 10 even when the owner is not in close proximity to the vehicle as described above. For example, in the event that the vehicle has been stolen, the owner can still prime the device 10 using the second remote control device 52 to ensure that the anti-theft device 10 locks as soon as the vehicle comes to a standstill. Engagement of the locking pawl 17 whilst the vehicle is in motion is undesirable and dangerous. Furthermore, the device 10 can be integrated with an existing vehicle alarm system so that it locks and unlocks together with the conventional alarm. The Applicant believes that the vehicle anti-theft device 10 in accordance with the invention will be a more effective vehicle theft deterrent than conventional anti-theft vehicle systems because it is difficult to bypass and fixates the entire driveshaft which immobilises the driven wheels of the vehicle and prevents towing. The first objective of a vehicle thief is to gain entry to the vehicle cabin. However, through the use of this anti-theft device 10, a thief would still not be able to drive the vehicle or disable or disengage the locking member 17 despite having gained entry to the vehicle cabin. And, even if the thief manages to disengage or unlock the anti-theft device 10 using the vehicle remote 51, the owner can override the vehicle remote 51 and still lock the anti-theft device 10 remotely from practically anywhere using his mobile phone 52.

The invention claimed is:

1. An anti-theft device for a vehicle which includes a power plant and a drivetrain, the power plant being drivingly connected to the drivetrain in order to propel the vehicle, the anti-theft device having an unlocked state, a locked state and a priority locked state, the anti-theft device including:
   a locking member which is mounted adjacent to the drivetrain, downstream of the power plant, and which is movable relative to the drivetrain between:
      an open position, in which the anti-theft device is in its unlocked state, and in which a driveshaft or transmission of the drivetrain is permitted to rotate freely, and
      an engaged or locked position, in which the locking member prevents displacement of the driveshaft or transmission by locking it in position thus immobilizing the vehicle;
   an actuator which is configured to displace the locking member from one of its open or locked positions to the other;
   an electronic control unit which is communicatively linked to the actuator in order to control actuation of the actuator, the electronic control unit also being configured to receive a motion signal indicative of movement of the vehicle; and
   at least one wireless communication module which is communicatively linked to the electronic control unit and is configured wirelessly to receive signals from first and second remote control devices and is configured to convey the signals received from the remote control devices to the electronic control unit,
   wherein, when the anti-theft device is not in its priority locked state, the electronic control unit is configured in response to receipt of a lock/unlock signal from the first remote control device to actuate the actuator in order to change the position of the locking member from one of its locked or open positions to the other, provided that the vehicle is not in motion or is moving at a speed which is below a predetermined threshold value; and, when the anti-theft device is in its priority locked state, the electronic control unit overrides any signals received from the first remote control device thus negating use of the first remote control device and giving priority to a priority signal received from the second remote control device, and wherein, once the lock signal has been received from one of the remote control devices and the electronic control unit detects that the vehicle's speed is greater than the predetermined threshold value, the anti-theft device is primed to lock, such that, as soon as the vehicle's speed is reduced to below the predetermined threshold value, the electronic control unit automatically actuates the actuator in order to move the locking member into its locked position.

2. The anti-theft device as claimed in claim 1, wherein, when the anti-theft device is in its locked state or in its priority locked state, the locking member is in its locked or engaged position.

3. The anti-theft device as claimed in claim 2, wherein the electronic control unit is configured to change the state of the anti-theft device from either of its unlocked or locked states to its priority locked state in response to receipt of a priority lock signal from the second remote control device, provided that the vehicle is not in motion or is the vehicle's speed is below the predetermined threshold value.

4. The anti-theft device as claimed in claim 3, which includes a vehicle speed sensor which is coupled to the electronic control unit and is configured to detect the speed at which the vehicle is travelling, when in motion, and to communicate this to the electronic control unit in the form of the motion signal.

5. The anti-theft device as claimed in claim 4, wherein the electronic control unit, actuator and locking member are housed within a tamper-proof casing, downstream of the power plant.

6. The anti-theft device as claimed in claim 4, wherein the electronic control unit, actuator, locking member and wireless communication module are housed within a tamper-proof casing, downstream of the power plant.

7. The anti-theft device as claimed in claim 6, which includes a Global Positioning System (GPS) which is configured to determine a current geolocation of the anti-theft device and to communicate the geolocation to the electronic control unit or wireless communication module.

8. The anti-theft device as claimed in claim 7, wherein the wireless communication module is configured to communicate the geolocation of the anti-theft device to the second remote control device, when the anti-theft device is in its priority locked state.

9. The anti-theft device as claimed in claim 8, wherein the GPS is housed within the tamper-proof casing together with, the speed sensor and a backup power supply configured to power the anti-theft device.

10. The anti-theft device as claimed in claim 6, wherein the tamper-proof casing is a transmission casing.

11. The anti-theft device as claimed in claim 1, wherein the electronic control unit is configured to actuate the actuator in order to move or allow movement of the locking member from its locked position to its open position and hence the anti-theft device to its unlocked state in response to receipt of a priority unlock signal from the second remote control device.

12. The anti-theft device as claimed in claim 1, wherein the wireless communication module includes a radio frequency receiver and a Global System for Mobile communication (GSM) modem configured to communicate with the second remote control device via a cellular network.

13. The anti-theft device as claimed in claim 12, in which the first remote control device is separate and distinct from the second remote control device, the remote control devices being configured to communicate with the wireless communication module using different communication standards and wherein the first remote control device is in the form of a hand-held radio frequency transmitter configured to transmit lock/unlock signals to the radio frequency receiver.

14. The anti-theft device as claimed in claim 13, in which the second remote control device is in the form of a mobile communication device configured to communicate with the GSM modem across the cellular network.

15. The anti-theft device as claimed in claim 1, in which the locking member is separate and distinct from a braking system of the vehicle.

16. The anti-theft device as claimed in claim 1, wherein, when in its locked position, the locking member engages the driveshaft or transmission and prevents relative angular displacement of a latter portion of the driveshaft or transmission.

17. The anti-theft device as claimed in claim 1, wherein the locking member includes a locking pawl which is pivotally displaceable relative to a toothed rotor of the drivetrain of the vehicle, the pawl having a head which is profiled to mate with a periphery of the toothed rotor when in its locked position, in order to prevent rotation of the drivetrain.

18. The anti-theft device as claimed in claim 17, wherein, due to profiling of the head of the pawl and the toothed rotor, the pawl is unable to engage the rotor whilst it is rotating at a velocity beyond a predetermined engagement threshold velocity, the actuator being in the form of an electrically driven worm gear which is configured to displace a pin which, in turn, is configured to urge the pawl into engagement with the toothed rotor.

19. A system for preventing vehicle theft, the system including:
at least one vehicle which includes a power plant and a drivetrain, the power plant being drivingly connected to the drivetrain in order to propel the vehicle;
an anti-theft device having an unlocked state, a locked state and a priority locked state, the anti-theft device including:
a locking member which is mounted adjacent to the drivetrain, downstream of the power plant, and which is movable relative to the drivetrain between:
an open position, in which the anti-theft device is in its unlocked state, and in which a driveshaft or transmission of the drivetrain is permitted to rotate freely; and
an engaged or locked position in which the locking member prevents displacement of the driveshaft or transmission by locking it in position thus immobilizing the vehicle;
an actuator which is configured to displace the locking member from one of its open or locked positions to the other;
an electronic control unit which is communicatively linked to the actuator in order to control actuation of the actuator, the electronic control unit also being configured to receive a motion signal indicative of movement of the vehicle; and
at least one wireless communication module which is communicatively linked to the electronic control unit;
a first remote control device configured wirelessly to transmit lock/unlock signals to the wireless communication module; and
a second remote control device, separate from the first remote control device, configured wirelessly to communicate with the wireless communication module, wherein the wireless communication module is configured to convey the signals received from the remote control devices to the electronic control unit,
wherein, when the anti-theft device is not in its priority locked state, the electronic control unit is configured in response to receipt of a lock/unlock signal from the first remote control device to actuate the actuator in order to change the position of the locking member from one of its locked or open positions to the other, provided that the vehicle is not in motion or is moving at a speed which is below a predetermined threshold value; and, when the anti-theft device is in its priority locked state, the electronic control unit overrides any signals received from the first remote control device thus negating use of the first remote control device and giving priority to a priority signal received from the second remote control device, and wherein, once the lock signal has been received from one of the remote control devices and the electronic control unit detects that the vehicle's speed is greater than the predetermined threshold value, the anti-theft device is primed to lock, such that, as soon as the vehicle's speed is reduced to below the predetermined threshold value, the electronic control unit automatically actuates the actuator in order to move the locking member into its locked position.

20. A method of controlling a system for preventing vehicle theft as claimed in claim 19, the method including:
sensing, using a speed sensor, motion of the vehicle; and
actuating the actuator in order to move the locking member into its locked position in response to receipt of the lock signal from either of the first or second remote control devices by the electronic control unit, provided that the vehicle is not in motion or the vehicle's speed is below the predetermined threshold value.

21. The method as claimed in claim 20, which includes:
prioritizing, using the electronic control unit, the priority signal received from the second remote control device by ignoring signals received from the first remote control device when the anti-theft device is in its priority locked state.

\* \* \* \* \*